April 24, 1956  G. E. KING ET AL  2,743,405
VARIABLE VOLTAGE MOTOR CONTROL
Filed March 17, 1955  3 Sheets-Sheet 1

WITNESSES:
E. A. Mihlosky.
John B. Davidson

INVENTORS
George E. King
and Arthur O. Fitzner.
BY
Paul E. Friedemann
ATTORNEY

United States Patent Office 2,743,405
Patented Apr. 24, 1956

2,743,405

VARIABLE VOLTAGE MOTOR CONTROL

George E. King, Eggertsville, N. Y., and Arthur O. Fitzner, Fond du Lac, Wis., assignors to Westinghouse Electric Corporation, East Pittsburgh, Pa., a corporation of Pennsylvania Application March 17, 1955, Serial No. 494,992

11 Claims. (Cl. 318—154)

Our invention relates to electric motor control systems and, more particularly, to control systems for controlling the operation of electric motors adapted to drive reciprocating machine tools, such as planer platens, transfer tables, and other similar loads.

In a variable voltage control system for the motor operating reciprocating machine tool, such as the platen of a planer, the armature of the direct current generator is serially connected in a closed loop with the armature of a drive motor that is provided with a separately excited field winding. The desired direction of rotation of the motor is effected by reversing the polarity of the energy supplied to the motor armature which, in turn, is effected by suitably energizing the generator field windings. In the Patent No. 2,205,204 of George E. King, there is described a system for controllably energizing the field of a D. C. generator incorporated in a control system of the nature generally described above. This particular control system utilizes a multi-field regulator-generator of special design, and the output current of the generator is determined by means of various signals coupled to the field windings thereof. While this particular type of control system has been found to be quite satisfactory for the purpose for which it was designed, it suffers from the disadvantage of using a rotating control device which perforce requires considerable maintenance, requires a very large control cabinet, and utilizes large speed control rheostats not adapted to be mounted in a position readily accessible to the operator of the machine.

One object of this invention is to provide a control system for reciprocating machine tools wherein are utilized only static component parts.

Another object of this invention is to provide a control system for reciprocating machine tools wherein control may be exercised by very small control devices, such as low power potentiometers adapted for mounting in a location readily accessible to the operator of the machine tool.

Still another object is to provide a control system for reciprocating machine tools, which control system has an extremely fast response to changes in the control signal.

A further object is to provide a control system adapted for mounting in a relatively small enclosure.

A still further object is to provide a control system for reciprocating machine tools that will present a minimum of maintenance problems.

Other objects and features of our invention will become apparent upon consideration of the following detailed description when taken in connection with the accompanying drawings, wherein.

Figure 1:
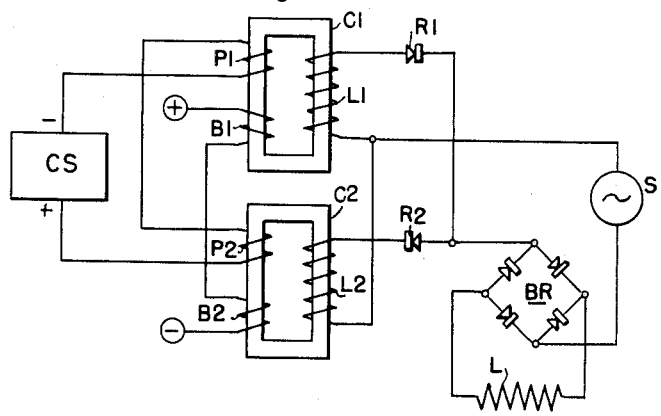
Figure 1 is a schematic diagram of a basic type of magnetic amplifier utilized as one of the elements in our invention.

The magnetic amplifier circuit shown in Fig. 1 is of the self-saturating type, generally referred to as a single-ended voltage doubler circuit. It consists of an alternating current power supply S, two reactors each having a ferromagnetic core (C1, C2), a load winding on each of said cores, respectively designated L1 and L2, one or more control windings, and rectifiers R1 and R2 in series respectively with each of the load windings L1 and L2. A full-wave bridge rectifier BR is inserted between the rectifiers and the power supply S, with the load device L connected across the output terminals thereof as shown. Each of the reactors has two control windings, one being a bias winding (B1, B2) which sets an ambient control magnetomotive force in the core with which it is associated with current flowing through the other windings on the core, and a pattern winding (P1, P2) which varies the ambient magnetomotive force in accordance with the magnitude and direction of flow of a control current from an external control source CS to withdraw the core from saturation in a given sense at a given rate. Other control windings may be included which either withdraw the core from saturation or drive the core to saturation in a given sense at a given rate responsive to conditions in the circuit to be controlled, such as will be described with reference to Figs. 3 and 4. The rectifiers are poled so that alternating current applied to the input terminals of bridge rectifier BR will flow through one of the rectifiers and the load winding associated therewith on first alternate half cycles of the alternating current source S, to thus have a self-saturating effect on one core and through the other of the rectifiers and the load winding associated therewith on second alternate half cycles of the alternating current source S, to thus have a self-saturating effect on the other core.

Figure 2B:
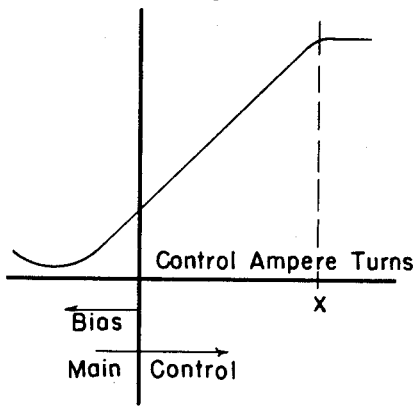
Fig. 2B is a curve of the average output voltage of the magnetic amplifier of Fig. 1 as a function of control ampere turns.
Figure 2A:
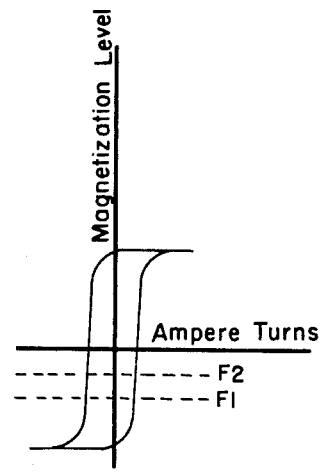
Fig. 2A is a hysteresis loop of the magnetic material utilized in the amplifier of Fig. 1, which loop is useful in understanding the operation of the magnetic amplifier.

On given first alternating half cycles of the supply source S, core C1 will be driven toward saturation by the supply current, and the pattern windings on core C2 will be resetting the flux level thereof to a value determined by the average current through the pattern windings over that half cycle. On given second alternate half cycles, core C2 will be driven toward saturation, and the magnetization level of core C1 will be reset to a value determined by the average control current through the pattern windings thereof during the half cycle. During a half cycle on which a particular core is being driven to saturation, substantially the entire supply voltage will appear across the load winding associated therewith until saturation is reached, thereafter, substantially the entire supply voltage will appear across the input terminals of bridge rectifier BR and consequently across load L. The portion of a half cycle required for a core to be driven to saturation is dependent upon the flux level set by the magnetomotive forces produced by current in the pattern winding and bias winding over the immediately preceding half cycle, and thus the average voltage appearing across the load will be similarly dependent. Since the current in bias windings B1 and B2 is fixed, the average voltage appearing across the load may be controlled by varying the current through the pattern windings P1 and P2. For example, and with reference to Fig. 2A, if the flux level produced by a given pattern current is F1, a lesser pattern will produce a magnetization level F2 over given respective half cycles. The core will be saturated earlier on its so-called forward half cycle (the half cycle on which the core is driven to saturation) with a magnetization level F2 at the beginning of the forward half cycle than with a magnetization level F1 at the beginning of the forward half cycle, and consequently, a greater average output voltage will be produced on the forward half cycle at the beginning of which a magnetization level F2 is obtained. Consequently, by increasing the ampere turns produced by the pattern winding current so as to lessen the extent to which the flux level of a given core is withdrawn from saturation on half cycles over which no current is flowing through the load windings thereof, the output voltage appearing across the load may be increased; this relationship is shown in Fig. 2B. When the pattern winding ampere turns are increased to a point whereat the core is saturated at the beginning of a forward half cycle, such as represented at "X" in Fig. 2B, the average output voltage will remain substantially constant with further increase in the pattern current.

Figure 3:
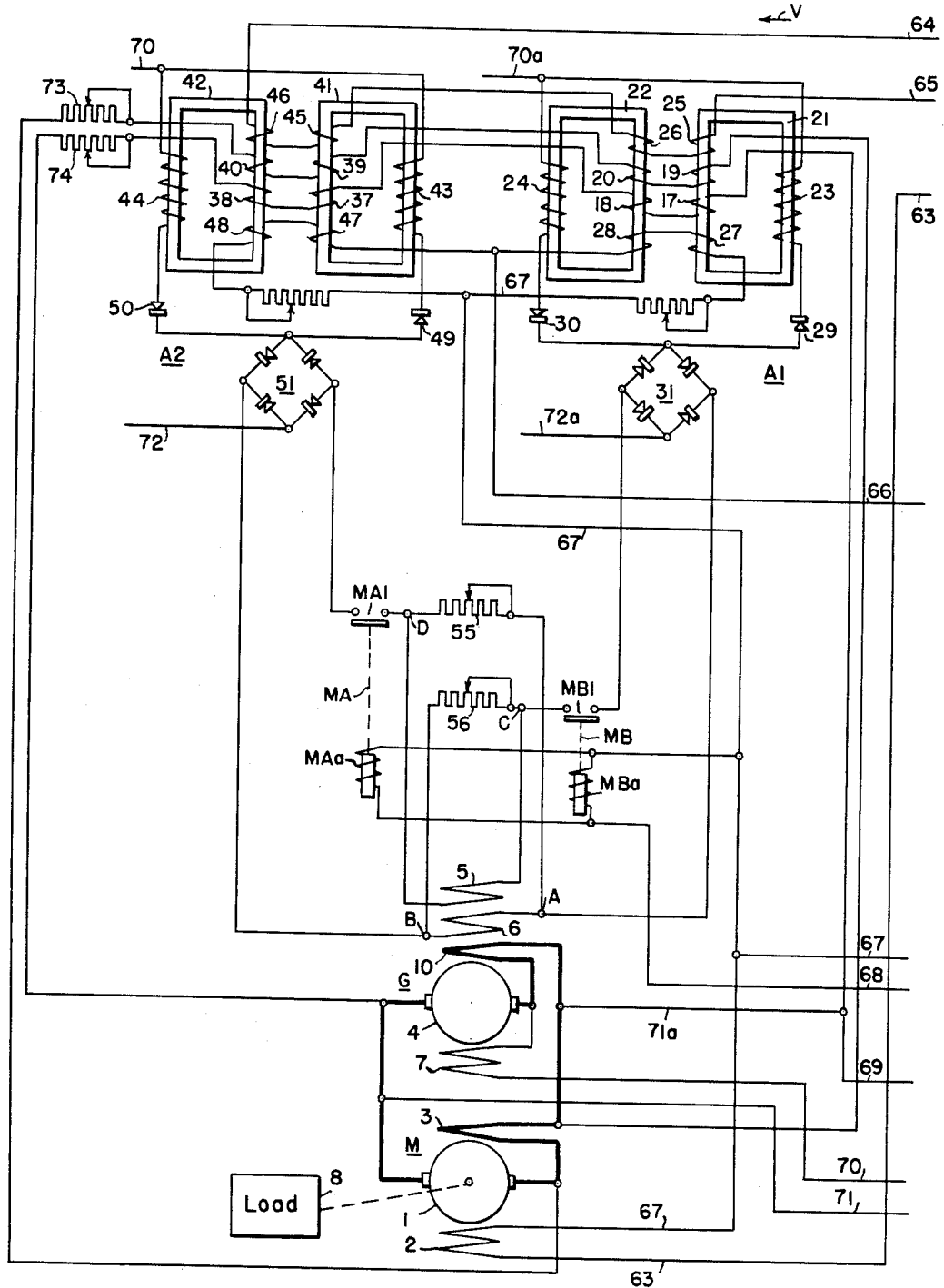
Figs. 3 and 4 are schematic diagrams which when taken together illustrate one embodiment of our invention.
Figure 4:
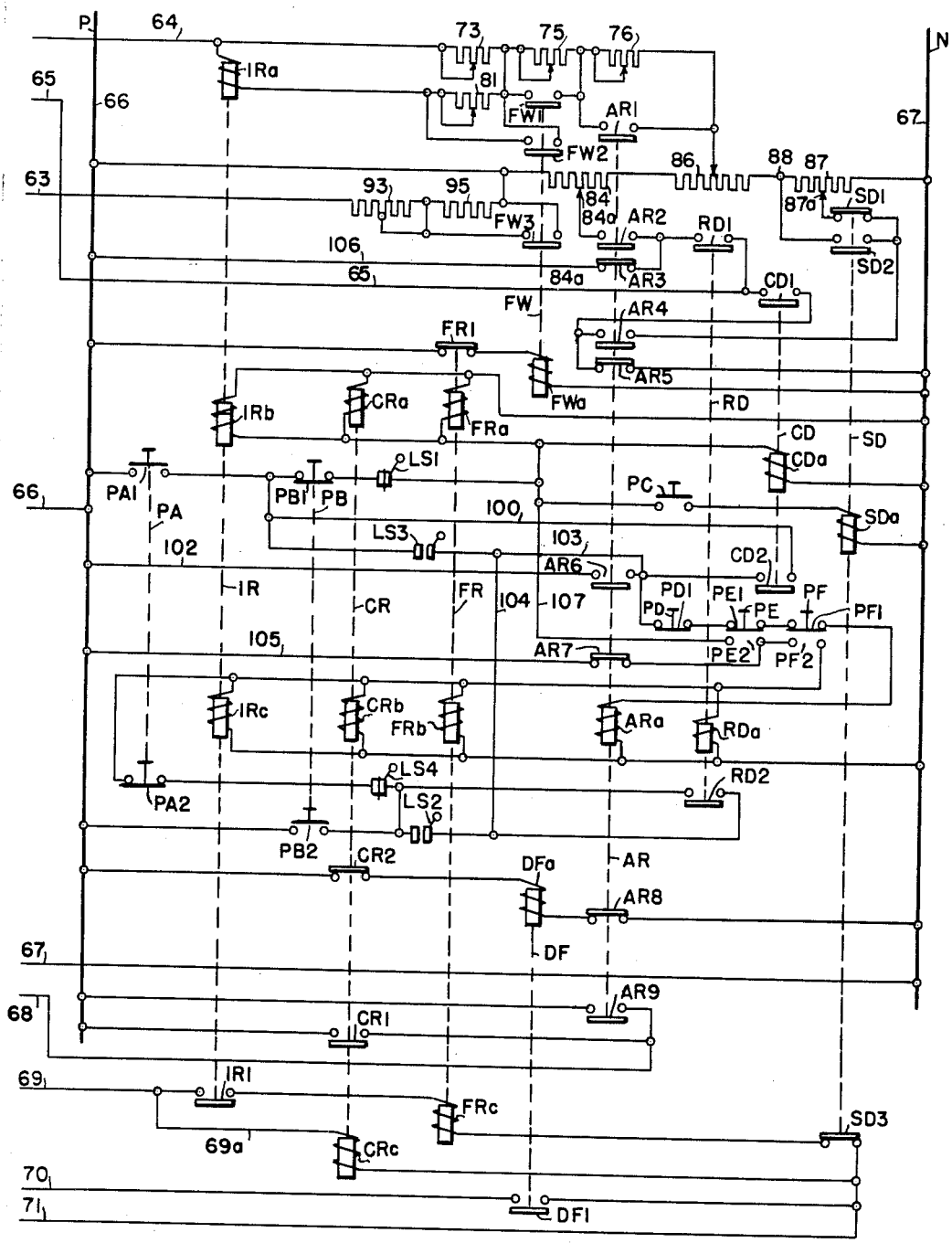

With reference now to the embodiment of our invention shown in Figs. 3 and 4, the motor to be controlled is denoted by M and its armature by 1. A load 8, which may be a planer platen, is mechanically coupled to the output shaft of motor M. The motor has a separately excited field winding 2 which is serially connected with resistors 93 and 95 between respectively positive and negative D. C. buses 66 and 67. The motor is also equipped with a commutation pole winding 3. A low ohmic value resistor may be substituted for field winding 3, if the motor to be used does not have such a commutating pole winding. Armature 1 and field winding 3 are serially connected across the armature 4 and commutation field winding 10 of a D. C. generator G, which is provided with two like separately excited field windings 5 and 6 with a relatively large number of turns in each. This is the well known Ward Leonard connection. Generator G additionally has a suicide, or differential, field winding 7 which is adapted to be connected across armature 4 by contact DF1 of relay DF. The generator may be driven by any suitable constant speed device, such as a synchronous motor or a squirrel-cage motor, with low slip.

A balanced magnetic amplifier is provided which comprises two individual single-ended doubler amplifier units A1 and A2, which are of the same type as that described above. Amplifier A2 is energized from A. C. buses 70 and 72, and amplifier A1 from A. C. buses 70a and 72a. Each amplifier unit is adapted to provide a unidirectional output current whose magnitude depends upon that of an input signal applied to pattern windings thereof. The amplifier unit A1 has two saturable reactors whose magnetizable cores are denoted by reference numerals 21 and 22, respectively. Each core has, respectively, main windings 23 and 24, control windings 25 and 26, bias windings 27 and 28, voltage windings 17 and 18, and load compensation windings 19 and 20. The main windings 23 and 24 are series connected with respective half-wave rectifiers 29 and 30, so that they lie parallel to each other between A. C. bus 70a, and one input terminal of a full-wave bridge rectifier 31. The other input terminal of rectifier 31 is connected to bus 72a. The amplifier unit A2 is designed in the same way, except for different A. C. buses, as noted above. Its individual elements denoted 37 to 51 correspond to the above-described respective elements 17 through 31 of the unit A1. The main windings 43 and 44 with the appertaining rectifiers 49 and 50 are connected in parallel relation to each other between A. C. bus 70 and one input terminal of bridge rectifier 51. The other input terminal of rectifier 51 is connected to bus 72. The control windings 25, 26, 45, and 46 are serially connected so that current therethrough in one direction, as denoted by arrow V, will produce an output current from the output terminals of bridge rectifier 51 and a current in the opposite direction will produce an output current from bridge rectifier 31. The pairs of bias windings 27 and 28, and 47 and 48 are individually energized from D. C. buses 66, 67 and the current therethrough is adjusted so that the amplifiers are biased close to cutoff; i. e., so that a minimal output voltage appears across output terminals of the respective bridge rectifiers associated therewith with no current applied to the other control windings associated therewith. Load compensating windings 39, 40, 19, and 20 are, likewise, serially connected with resistor 73 across commutator winding 3 so that an increase in the armature current of motor M with no change in the current through the pattern windings of the magnetic amplifiers, such as will tend to change the output speed of motor M, will produce a change in the output current of the magnetic amplifiers that will tend to restore the output speed of motor M to very nearly its original value. Further, voltage windings 37, 38, 17, and 18 are serially connected with variable resistor 74 across the armature 4 and commutator winding 10 of generator G so as to produce changes in the output current from the magnetic amplifiers that will tend to maintain the output voltage of generator G at a steady value with no change in pattern current.

Two resistors 55 and 56 are series connected with the generator field windings 5 and 6 in a loop circuit so as to form a bridge network with four intermediate terminal points A, B, C, and D. Preferably, the resistors 55 and 56 have equal resistance, and the windings 5 and 6 have equal ampere turns and equal resistance. The positive output terminals of bridge rectifiers 31 and 51 are respectively connected to points A and B, while the negative terminals thereof are respectively connected to terminals C and D through contacts MB1 and MA1. These contacts are associated respectively with relays MB and MA having control coils MBa and MAa, respectively. The manner of connecting the magnetic amplifiers to the respective field windings of generator G and the advantages associated therewith have been described in the Patent No. 2,629,847 of W. F. Eames et al., and will not be further discussed herein.

The control circuitry for the system hereinabove described will be best understood by a description of the operating cycles thereof. The pattern current for pattern windings 25, 26, 45, and 46 of magnetic amplifier channels A1 and A2 is derived from potentiometer 84, center-tap resistor 86 and potentiometer 87, which are serially connected in the order named between positive D. C. bus 66 and negative D. C. bus 67. The free terminal of winding 46 (that terminal not connected to winding 45) is connected to the center tap of resistor 86 by means of serially-connected resistors 73, 75, and 76. The free terminal of winding 25 is selectively connected to tap 84a of potentiometer 84, to tap 87a of potentiometer 87, and to the junction 88 of resistor 86 and potentiometer 87, as hereinafter described.

Assume that the planer platen has previously been stopped intermediate its limits of travel, so that limit switches LS1 and LS4 are closed and limit switches LS3 and LS2 are open, that buses 66, 67, 70, 72, 70a, and 72a have been energized by appropriate voltage sources, and that automatic operation of the planer is desired. Relay coils FWa and DFa will be energized actuating relays FW and DF to apply maximum field current to field 2 and to connect differential field 7 across armature 4. Momentarily pressing push button PA will close contact PA1 and open contact PA2, and complete a circuit from positive bus 66 through contacts PA1, PB1, LS1, and coil CDa to negative bus 67, thereby actuating relay CD and closing contacts CD1 and CD2. Simultaneously, relay coils IRb, CRa, and FRa are energized; relay CR will be actuated opening contacts CR2 and closing contacts CR1, the latter contacts thereby energizing coils MAa and MBa and closing contacts MA1 and MB1 to connect the load terminals of rectifiers 51 and 31 to generator fields 5, 6. Energization of coil FRa will open contact FR1, deenergizing coil FWa of relay FW and opening contacts FW1, FW2, and FW3, which contacts when closed respectively short-circuit resistor 75, resistor 81 (which is in series with coil IRa of relay IR, the function of which will be described below) and resistor 95. Closure of contact CD2 will complete a current conduction path from contacts PA1 through line 100, contacts CD2, PD1, PE1, PF1, relay coil ARa to negative bus 67, thereby picking up relay AR. Contact AR6 will close completing a circuit from positive bus 66 to contact PD1 and effectively short-circuit the circuit including contacts PA1, lead 100, and contact CD2 so that coil ARa will remain energized after push button PA has been released. Coil CDa will remain energized by virtue of current through the current conduction path including lead 102, contacts AR6 and CD2, lead 100, contact PB1 and limit switch LS1 so that relay CD remains actuated.

The opening of contact AR8 will deenergize relay coil DFa, dropping out relay DF and opening contact DF1. This will disconnect the differential field 7 from across the terminals of armature 4, thereby permitting the armature voltage of generator G to build up upon energization of field windings 5 and 6. The opening of contact AR8 when relay AR picks up will insure that relay DF remains dropped out should relay CR2 subsequently drop out.

Closure of contacts CD1 and AR4 will complete a current conduction path from the free terminal of pattern winding 25 of core 21 through lead 65, contacts CD1, AR4 and SD1 to potentiometer tap 87A. This will effect current conduction through the pattern windings of the magnetic amplifier in the direction of arrow V, thereby producing an output from magnetic amplifier channel A2, as described above, exciting fields 5 and 6, thereby permitting the armature voltage of generator G to build up so as to drive motor M in the cut direction.

Near the end of the cut stroke, limit switches LS1 and LS2 will be respectively opened and closed by dogs affixed to the planer platen in the usual manner. Opening of limit switch LS1 will deenergize relay coil CDa, thereby opening contacts CD1 and CD2 and cutting off the flow of current through the pattern windings of the magnetic amplifiers. Closure of limit switch LS2 will complete a current conduction path from positive bus 66 through lead 102, contact AR6, leads 103 and 104, the limit switch LS2, limit switch LS4, contact PA2, and the respective relay coils IRc, CRb, FRb, and RDa. Relay coils CRb and FRb will be energized substantially simultaneously with the deenergization of coils CRa and FRa resulting from the opening of limit switch LS1, so that relays CR and FR will remain actuated. Relay RD will pick up upon the energization of coil RDa, closing contacts RD1 and RD2. Closure of contact RD1 will complete a current conduction path from the free terminal of pattern winding 25 through lead 65, contact RD1, contact AR2 to potentiometer tap 84A, resulting in a current flow through the pattern windings of the magnetic amplifier in a direction opposite to that of vector V. The output current from magnetic amplifier channel A2 will drop to zero while that from channel A1 will build up very quickly to reverse the current in generator field windings 5 and 6, thereby causing the armature voltage of generator G to quickly drop to zero and reverse polarity, and thereby regeneratively brake motor M to a stop and reverse its direction of rotation to a speed determined by the output voltage of generator G. As the planer platen is driven in the return direction, limit switches LS1 and LS2 will again be tripped to close LS1 and open LS2. Contact RD2 effectively short-circuits limit switch LS2 so that relay RD will remain actuated.

Near the end of the return stroke, limit switches LS3 and LS4 will be respectively closed and opened by dogs on the planer plate. Opening of limit switch LS4 will deenergize coil RDa, dropping out relay RD and opening contacts RD1 and RD2. Closure of limit switch LS3 will complete a circuit from positive bus 66 through lead 102, contact AR6, lead 103, limit switch LS3, push button contact PB1, limit switch LS1, and relay coil CDa to negative bus N. Contact CD1 will pick up, again closing contacts CD1 and CD2, and connect potentiometer tap 87A to pattern winding 25, as described above. Current will again flow through the pattern windings in the direction shown by vector V, the output current from magnetic channel A1 will drop to zero and that from channel A2 will again rise to its former value. The excitation current through field windings 5 and 6 will reverse, reversing the polarity of the armature voltage of generator G, regeneratively braking motor M to a stop and thereafter accelerating it in the cut direction of rotation. As the planer moves on its return stroke, limit switches LS3 and LS4 are tripped to their normal positions as shown.

Should it be desired to initially start the platen on a return stroke, it is only necessary to depress push button PB. This will complete a circuit from bus 66, through contacts DB2, LS4, PA2, through the parallel-connected relay coils IRc, CRb, FRb, and RDa, picking up relays RD, FR, and CR. Closure of contacts RD2 will pick up relay AR by completing a circuit through coil ARa, contacts PF1, PE1, PD1, RD2, and PB2, then sealing in the relay AR as described above. Closure of contacts RD1 and AR2 will energize the magnetic amplifier control windings to accelerate the main drive motor in the return direction.

The above cycle of operation will be repetitively continued until either of push buttons PC and PD are depressed. The function of these push buttons is to actuate circuitry that will respectively slow down motor operation during a cut stroke and stop motor operation. Depressing push button PC will complete a circuit from limit switch LS1 through coil SDa of relay SD. Relay SD will pick up opening contacts SD1 and SD3, and closing contact SD2. Pattern winding 25 is disconnected from tap 87a by virtue of the opening of contact SD1 and is connected to the juncture 88 of resistor 86 and potentiometer 87 to effectively cut down the flow of current through the pattern windings to a value determined by the voltage between the juncture 88 and the center tap of resistor 86, while the planer is on a cut stroke. Opening of contacts SD3 will drop out relay FR, closing contact FR1 to pick up relay FW. Resistor 95 will be short-circuited by contact FW3 to apply maximum field current to the motor field 2 and thereby decrease the speed of the motor by virtue thereof. The overall effect of depressing push button PC is to slow the motor speed to a fixed value determined by the full field current through motor field 2 and by the pattern current determined by the voltage across half of resistor 86 and by the values assigned to resistor 73.

Depressing stop button PD will deenergize relay coil ARa causing relay AR to drop out. Those of relays CR, IR, FR, CD, and RD that are picked up at the time that PD is depressed, will immediately drop out. Opening of contacts AR2 and AR4 will be effective to interrupt current flow through the pattern windings of the magnetic amplifier, regardless of the direction of flow of current previously obtained. Closure of contacts AR8 and CR2 will energize relay coil DFa, picking up relay DF and closing contact DF1. However, relay CR will remain actuated until the armature voltage of generator G has fallen to a sufficiently low value by virtue of the current through CRc that will flow as a result of the voltage output of generator G, coil CRc being connected across the armature and commutator winding of generator G through leads 71a, 69, 69a, and 71. This precaution prevents damage that could result from excessive current flow through differential winding 7. All of relay coils FR*a*, FR*b*, and FR*c* will be deenergized, closing contact FR1, thereby picking up relay FW and closing contact FW3 to apply full field to motor 1. The motor speed will fall off in accordance with the load thereon and the voltage applied by generator G until the motor stops; the motor will not creep thereafter, inasmuch as full field current is applied to the field 2 thereof, and no armature voltage can be produced by generator G as a result of the connection of differential winding 7 across armature 4.

When it is desired to dispense with automatic control and operate the planer under the hand control of the human operator, push buttons PE and PF are depressed for driving the motor in the cut direction and in the return direction, respectively. When push button PE is depressed, a circuit is completed from positive bus 66 through lead 105, contacts AR7 and PE2, lead 107, and all of the parallel-connected relay coils IR*b*, CR*a*, FR*a*, and CD*a* to negative bus 67. Only relays CD, FR, and CR will pick up. Relay CR will be effective to disconnect the differential field 7 from across generator armature 4, as described above. Relay FR will be effective to actuate relay FW and apply full field current to the motor field winding 2, likewise as described above. Closure of contact CD1 will now be effective to connect pattern winding 25 to negative bus 67 through contact AR5, which latter contact is normally closed. Since contact AR1 is now open, resistor 76 will be effective to limit the current through pattern field windings of the magnetic amplifier so that the output voltage of the magnetic amplifier channel A2 will be dependent upon the voltage between center tap of resistor 86 and the bus 67, and the combined resistance of resistors 73 and 76. The speed of operation of the planer on the cut stroke may thus be adjusted by varying the resistance of resistor 76.

Depressing push button PF will close contacts PF2, thereby completing a circuit from positive bus 66 through lead 105, contact AR7, contact PF2 and through all of the coils IR*c*, CR*b*, FR*b*, and RD*a* to negative bus 67. Relay IR will not pick up, but relays CR and FR will pick up to perform the functions described in connection with the depressing of push button PE. Relay RD will pick up to close contact RD1 and complete a circuit from pattern winding 25 through lead 65, contact RD1, contact AR3 to positive lead 66. The current through the pattern field will thus be in a direction reverse to that of vector V and will be governed primarily by the voltage between bus 66 and the center tap of resistor 86 and by the combined resistance of resistors 73 and 76, as described above.

It will be recognized that the objects of the invention have been achieved by providing a control system for reciprocating machine tools utilizing magnetic amplifiers as the elements controlling the field excitation of the generator supplying armature current to the machine tool drive motor. Small, low-current potentiometers control the operating speed of the drive motor and the machine tool, and these potentiometers may very easily be mounted in the pendant control station ordinarily affixed to the machine tool. The maintenance problem ordinarily associated with the control system utilizing devices, such as regulator generators, has been entirely eliminated inasmuch as only static control components are used in the control system for the main generator. The entire magnetic amplifier control system may conveniently be mounted in a cabinet of relatively small dimensions which may be placed at any convenient position, but not necessarily in the immediate proximity of the operator of the machine tool.

The invention is not to be restricted to the specific structural details, arrangement of parts or circuit connections herein set forth, as various modifications thereof may be effected without departing from the spirit and scope of this invention.

We claim as our invention:

1. A control system for controlling the speed of operation of a reciprocating machine tool comprising: a direct current, constant-potential source; a direct-current, separately-excited-field motor for operating the machine tool; a direct-current, separately-excited-field generator having its armature connected in a series loop with the motor armature; first and second self-saturating magnetic amplifier means, the outputs of which are coupled across said generator field, each having first, second, and third control windings, said first control windings of each magnetic amplifier means being connected in series and to a reversible control voltage means such that current therethrough in one direction will produce an output voltage from said first magnetic amplifier means and current in the opposite direction will produce an output voltage from said second magnetic amplifier means; the output of said first magnetic amplifier being connected to said generator field so as to produce an output from said generator of one polarity, and the output of said second magnetic amplifier being connected to said generator field so as to produce an output voltage from said generator of the opposite polarity, said second control windings being connected in series across the generator armature to vary the output voltages of said magnetic amplifier means inversely with the generator output voltage; said third control winding being connected in said motor armature circuit so as to vary magnetic amplifier output voltage as a direct function of the magnitude of the motor load.

2. A control system for controlling the speed of operation of a reciprocating machine tool comprising, a constant-potential source of direct current; a direct-current, separately-excited-field motor for operating the machine tool; a direct-current, separately-excited-field generator the armature of which is connected in series with the motor armature in the Ward-Leonard manner; first and second magnetic amplifier means, the outputs of which are coupled across said generator field, each having first, second, and third control windings, said first control windings of said magnetic amplifier means being connected in series and to a reversible control voltage means such that current therethrough in one direction will produce an output voltage from one magnetic amplifier, and current in the opposite direction will produce an output voltage from said second magnetic amplifier; the output of said first magnetic amplifier being connected to said generator field so as to produce an output from said generator of one polarity, and the output of said second magnetic amplifier being connected to said generator field so as to produce an output voltage from said generator of the opposite polarity, said second control windings being connected in series across the generator armature to reduce the output voltages of said magnetic amplifier means with increase with the generator output voltage; said third control winding being connected to said motor armature so as to oppose increase of magnetic amplifier output voltage with increase of motor load, said reversible control-voltage means comprising a first variable-tap potentiometer, a center-tapped resistance means, and a second variable-tap potentiometer connected in that order across said direct-voltage source, means connecting said center-taps to one terminal of said serially-connected first winding means, and means coupled to said variable taps of said first and second potentiometer adapted to connect said variable taps in alternation to the other terminal of said serially-connected first winding means at predetermined positions of the reciprocating machine tool.

3. A control system for controlling the speed of operation of a reciprocating machine tool comprising, a direct voltage, constant-potential source; a direct-current, separately-excited-field motor for operating the machine tool; a direct-current, separately-excited-field generator connected in series with the motor armature; first and second magnetic amplifier means, the outputs of which are coupled across said generator field, each having first, second, and third control windings, said first control windings of each magnetic amplifier means being connected in series and to a reversible control voltage means such that current therethrough in one direction will produce an output voltage from one magnetic amplifier and current in the opposite direction will produce an output voltage from said second magnetic amplifier; the output of said first magnetic amplifier being connected to said generator field so as to produce an output from said generator of one polarity, and the output of said second magnetic amplifier being connected to said generator field so as to produce an output voltage from said generator of the opposite polarity, said second control windings being connected in series across the generator armature to reduce the output voltages of said magnetic amplifier means in accordance with the generator output voltage; said third control winding being connected to said motor armature so as to oppose increase of magnetic amplifier voltage with increase of motor load, said reversible control-voltage means comprising a first variable-tap potentiometer, a center-tapped resistance means, and a second variable-tap potentiometer connected in that order across said direct-voltage source, calibrating resistance means connecting said center-taps to one terminal of said serially-connected first winding means, and means coupled to said variable taps of said first and second potentiometer adapted to connect said variable taps in alternation to the other terminal of said serially-connected first winding means at predetermined positions of the reciprocating machine tool, means coupled to said calibrating resistance and to said motor field responsive to a given current through said calibrating resistance adapted to simultaneously increase the resistance of said calibrating resistance and decrease the field current of said motor so as to maintain a given motor speed at the potentiometer position corresponding to said given current.

4. A control system for controlling the speed of operation of a reciprocating machine tool comprising: a direct voltage, constant-potential source; a direct-current, separately-excited-field motor for operating the machine tool; a direct-current, separately-excited-field generator connected in series with the motor armature; magnetic amplifier means the output circuit of which is coupled to said separately excited field of said generator to control the output voltage thereof, said magnetic amplifier means being responsive to the output current of a potentiometer-controlled current source coupled to control winding means thereon through a calibrating resistance, means coupled to said calibrating resistance and to said motor field adapted to simultaneously increase the value of said calibrating resistance and decrease the motor field current so as to maintain a given motor speed at a given potentiometer setting while decreasing the output voltage from said magnetic amplifier means.

5. A control system for controlling operation of a reciprocating machine tool comprising: a direct current motor for operating the machine tool; a constant-potential source of direct current; a direct-current, separately-excited-field motor for operating the machine tool; a direct-current generator having separately-excited-field means and having its armature connected in series with the motor armature in the Ward-Leonard manner; magnetic amplifier means the output circuit of which is coupled to said separately excited field means of said generator to control the magnitude and polarity of the output voltage thereof, said magnetic amplifier means being responsive to the output current of a potentiometer-controlled current source coupled to control winding means thereon through a calibrating resistance, means coupled to said calibrating resistance and to the motor field circuit adapted to short circuit part of said calibrating resistance and to maintain a high motor field current, said means being responsive to a given current through said calibrating resistance to remove said short circuit and to simultaneously decrease said motor field current.

6. A control system for controlling the speed of operation of a reciprocating machine tool comprising, a direct voltage, constant-potential source; a direct-current, separately-excited-field motor for operating the machine tool; a direct-current, separately-excited-field generator connected in series with the motor armature; first and second magnetic amplifier means, the outputs of which are coupled across said generator field, each having first, second, and third control windings, said first control windings of each magnetic amplifier means being connected in series and to a reversible-polarity control voltage means such that current therethrough in one direction will produce an output voltage from one magnetic amplifier and current in the opposite direction will produce an output voltage from said second magnetic amplifier; the output of said first magnetic amplifier being connected to said generator field so as to produce an output from said generator of one polarity, and the output of said second magnetic amplifier being connected to said generator field so as to produce an output voltage from said generator of the opposite polarity, said second control windings being connected in series across the generator armature to reduce the output voltages of said magnetic amplifier means in accordance with the generator output voltage; said third control winding being responsive to current through said motor armature so as to increase the magnetic amplifier output voltage with increase of motor load, said reversible control-voltage means comprising a first variable-tap potentiometer, a center-tapped resistance means, and a second variable-tap potentiometer connected in that order across said direct-voltage source; first relay means adapted to connect the variable tap of said first potentiometer to the other terminal of said serially connected first winding means, second relay means adapted when energized to connect the variable tap of said second potentiometer to said other terminal of said serially connected first winding means, and means coupled to said first and second relay means adapted to energize them in alternation at predetermined positions of said reciprocating machine tool; means coupled to said calibrating resistance and to said motor field responsive to a given current through said calibrating resistance adapted to simultaneously increase the resistance of said calibrating resistance and decrease the field current of said motor so as to maintain a given motor speed at the potentiometer position corresponding to said given current.

7. A control system for controlling the speed of operation of a reciprocating machine tool comprising, a direct voltage, constant-potential source; a direct-current, separately-excited-field motor for operating the machine tool; a direct-current, separately-excited-field generator connected in series with the motor armature; first and second magnetic amplifier means, the outputs of which are coupled across said generator field, each having first, second, and third control windings, said first control windings of each magnetic amplifier means being connected in series and to a reversible-polarity control voltage means such that current therethrough in one direction will produce an output voltage from one magnetic amplifier and current in the opposite direction will produce an output voltage from said second magnetic amplifier; the output of said first magnetic amplifier being connected to said generator field so as to produce an output from said generator of one polarity, and the output of said second magnetic amplifier being connected to said generator field so as to produce an output voltage from said generator of the opposite polarity, said second control windings being connected in series across the generator armature to reduce the output voltages of said magnetic amplifier means in accordance with the generator output voltage; said third control winding being responsive to current through said motor armature so as to increase the magnetic amplifier output voltage with increase of motor load, said reversible control-voltage means comprising a first variable-tap potentiometer, a center-tapped resistance means, and a second variable-tap potentiometer connected in that order across said direct-voltage source; first relay means adapted to connect the variable tap of said first potentiometer to the other terminal of said serially connected first winding means, second relay means adapted when energized to connect the variable tap of said second potentiometer to said other terminal of said serially connected first winding means, and means coupled to said first and second relay means adapted to energize them in alternation at predetermined positions of said reciprocating machine tool; means coupled to said calibrating resistance and to said motor field responsive to a given current through said calibrating resistance adapted to simultaneously increase the resistance of said calibrating resistance and decrease the field current of said motor so as to maintain a given motor speed at the potentiometer position corresponding to said given current and variable actuated relay means for disconnecting said first potentiometer tap from said other terminal and connecting said other terminal to the junction of said other potentiometer and said center tapped resistor.

8. In a control system for controlling the operation of a reciprocating machine tool including a direct current drive motor for said machine tool having a separately energized field winding, a direct current generator having separately excited field means, and differential field means, said motor and generator having a common armature circuit connected in the Ward-Leonard manner, output reversible magnetic amplifier means for energizing said separately excited field means to control the magnitude and polarity of the output voltage of said generator in accordance with the magnitude and direction of flow of current through a control winding thereof: first potentiometer means having a first variable tap, first resistor means having a tap thereon, and second potentiometer means having a second variable tap serially connected in the order named and adapted to be energized from a direct current source; first relay means operative when actuated to connect the voltage between said first variable tap and said tap on said resistor means to said control winding so as to effect current flow of one direction therethrough; second relay means operative when actuated to connect the voltage between said second variable tap and said tap of said first resistor to said control winding so as to effect current flow of the opposite direction therethrough; actuating means coupled to said first and second relay means operative to actuate said relay means in alternation at predetermined positions of said machine tool.

9. In a control system for controlling the operation of a reciprocating machine tool including a direct current drive motor for said machine tool having a separately energized field winding, a direct current generator having separately excited field means, and differential field means, said motor and generator having a common armature circuit connected in the Ward-Leonard manner, output reversible magnetic amplifier means for energizing said separately excited field means to control the magnitude and polarity of the output voltage of said generator in accordance with the magnitude and direction of flow of current through a control winding thereof: first potentiometer means having a first variable tap, first resistor means having a tap thereon, and second potentiometer means having a second variable tap serially connected in the order named and adapted to be energized from a direct current source; first relay means operative when actuated to connect the voltage between said first variable tap and said tap on said resistor means to said control winding so as to effect current flow of one direction therethrough; second relay means operative when actuated to connect the voltage between said second variable tap and said tap of said first resistor to said control winding so as to effect current flow of the opposite direction therethrough; actuating means coupled to said first and second relay means operative to actuate said relay means in alternation at predetermined positions of said machine tool; third relay means responsive to current of predetermined magnitude through said control winding corresponding to maximum output current of said magnetic amplifier operative to simultaneously reduce the magnitude of current flow through said control winding and decrease the magnitude of current flow through said motor field winding.

10. In a control system for controlling the operation of a reciprocating machine tool including a direct current drive motor for said machine tool having a separately energized field winding, a direct current generator having separately excited field means, and differential field means, said motor and generator having a common armature circuit connected in the Ward-Leonard manner, output reversible magnetic amplifier means for energizing said separately excited field means to control the magnitude and polarity of the output voltage of said generator in accordance with the magnitude and direction of flow of current through a control winding thereof: first potentiometer means having a first variable tap, first resistor means having a tap thereon, and second potentiometer means having a second variable tap serially connected in the order named and adapted to be energized from a direct current source; first relay means operative when actuated to connect the voltage between said first variable tap and said tap on said resistor means to said control winding so as to effect current flow of one direction therethrough; second relay means operative when actuated to connect the voltage between said second variable tap and said tap of said first resistor to said control winding so as to effect current flow of the opposite direction therethrough; actuating means coupled to said first and second relay means operative to actuate said relay means in alternation at predetermined positions of said machine tool; third relay means responsive to current of predetermined magnitude through said control winding corresponding to maximum output current of said magnetic amplifier operative to simultaneously reduce the magnitude of current flow through said control winding and decrease the magnitude of current flow through said motor field winding; fourth relay means normally connecting said differential field winding across said generator armature to prevent generation of voltage thereby, having first coils energized by said actuating means to disconnect said differential field winding from said motor armature and further having a coil energized by voltage across said generator armature to prevent said differential field winding from being connected across said generator armature with said first coils deenergized until the voltage across said armature has fallen to a predetermined value; said fourth relay means when actuated in turn actuating relay means for connecting the output of said magnetic amplifier means to said generator separately energized field windings.

11. In a control system for controlling the operation of a reciprocating machine tool including a direct current drive motor for said machine tool having a separately energized field winding, a direct current generator having separately excited field means, and differential field means, said motor and generator having a common armature circuit connected in the Ward-Leonard manner, output reversible magnetic amplifier means for energizing said separately excited field means to control the magnitude and polarity of the output voltage of said generator in accordance with the magnitude and direction of flow of current through a control winding thereof: first potentiometer means having a first variable tap, first resistor means having a tap thereon, and second potentiometer means having a second variable tap serially connected in the order named and adapted to be energized from a direct current source; first relay means operative when actuated to connect the voltage between said first variable tap and said tap on said resistor means to said control winding so as to effect current flow of one direction therethrough; second relay means operative when actuated to connect the voltage between said second variable tap and said tap of said first resistor to said control winding so as to effect current flow of the opposite direction therethrough; actuating means coupled to said first and second relay means operative to actuate said relay means in alternation at predetermined positions of said machine tool; third relay means responsive to current of predetermined magnitude through said control winding corresponding to maximum output current of said magnetic amplifier operative to simultaneously reduce the magnitude of current flow through said control winding and decrease the magnitude of current flow through said motor field winding; fourth relay means normally connecting said differential field winding across said generator armature to prevent generation of voltage thereby, having first coils energized by said actuating means to disconnect said differential field winding from said motor armature and further having a coil energized by voltage across said generator armature to prevent said differential field winding from being connected across said generator armature with said first coils deenergized until the voltage across said armature has fallen to a predetermined value; said fourth relay means when actuated in turn actuating relay means for connecting the output of said magnetic amplifier means to said generator separately energized field windings; said first coils of said fourth relay means being further energized upon closure of either of first and second manual switches, said first and second manual switches being operative to energize said first and second relay means respectively independently of said actuating means.

No references cited.